(12) United States Patent
Hooker et al.

(10) Patent No.: US 7,191,320 B2
(45) Date of Patent: Mar. 13, 2007

(54) APPARATUS AND METHOD FOR PERFORMING A DETACHED LOAD OPERATION IN A PIPELINE MICROPROCESSOR

(75) Inventors: Rodney E. Hooker, Austin, TX (US); Daniel W. J. Johnson, Round Rock, TX (US); Albert J. Loper, Austin, TX (US)

(73) Assignee: VIA Technologies, Inc. (TW)

( * ) Notice: Subject to any disclaimer, the term of this patent is extended or adjusted under 35 U.S.C. 154(b) by 527 days.

(21) Appl. No.: 10/776,751

(22) Filed: Feb. 11, 2004

(65) Prior Publication Data

US 2004/0172521 A1  Sep. 2, 2004

Related U.S. Application Data

(60) Provisional application No. 60/446,729, filed on Feb. 11, 2003.

(51) Int. Cl.
   G06F 9/24    (2006.01)
   G06F 9/445   (2006.01)

(52) U.S. Cl. .................................................. 712/229

(58) Field of Classification Search ................ 712/219, 712/229, 232, 217
   See application file for complete search history.

(56) References Cited

U.S. PATENT DOCUMENTS

| | | | |
|---|---|---|---|
| 5,606,670 A | | 2/1997 | Abramson et al. |
| 5,671,444 A | * | 9/1997 | Akkary et al. ................. 710/52 |
| 5,717,896 A | * | 2/1998 | Yung et al. ................... 712/205 |
| 5,737,636 A | * | 4/1998 | Caffo et al. .................... 710/54 |
| 5,751,983 A | | 5/1998 | Abramson et al. |
| 5,828,860 A | * | 10/1998 | Miyaoku et al. ............. 712/207 |
| 6,035,394 A | * | 3/2000 | Ray et al. ..................... 712/245 |
| 6,374,344 B1 | * | 4/2002 | Webb et al. .................. 712/205 |
| 6,438,704 B1 | * | 8/2002 | Harris et al. ................. 713/502 |
| 6,968,444 B1 | * | 11/2005 | Kroesche et al. ............ 712/208 |

* cited by examiner

*Primary Examiner*—Eric Coleman
(74) *Attorney, Agent, or Firm*—E. Alan Davis; James W. Huffman

(57) ABSTRACT

A pipeline microprocessor that distributes the instruction dispatching function between a main instruction dispatcher and dispatching logic within a plurality of execution units is disclosed. If the main instruction dispatcher requests load data from a data cache that indicates the data is unavailable, the instruction dispatcher provides to the appropriate execution unit the load instruction (without the load data), a tag (also known by the cache) uniquely identifying the unavailable data, and a false data valid indicator. The cache subsequently obtains the data and outputs it on a bus along with the tag. The dispatching logic in the execution unit is monitoring the bus looking for a valid tag that matches tags of entries in its queue with invalid data indicators. Upon a match, the dispatching logic obtains the data from the bus and subsequently dispatches the instruction along with the data to a functional unit for execution.

49 Claims, 3 Drawing Sheets

Instruction Queue

Execution Unit

APPARATUS AND METHOD FOR PERFORMING A DETACHED LOAD OPERATION IN A PIPELINE MICROPROCESSOR

PRIORITY INFORMATION

This application claims priority based on U.S. Provisional Application, Ser. No. 60/446,729, filed Feb. 11, 2003, entitled APPARATUS FOR PERFORMING DETACHED LOAD OPERATIONS IN A MICROPROCESSOR.

FIELD OF THE INVENTION

This invention relates in general to the field of load operations in microprocessors and particularly to avoiding microprocessor pipeline stalls related to load operations.

BACKGROUND OF THE INVENTION

Modern microprocessors are pipelined microprocessors. That is, they operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. They go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Synchronous microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

Typically, the initial stages of a microprocessor pipeline fetch program instructions and provide the instructions to logic that dispatches, or issues, the instructions to the stages of the pipeline that actually execute the instructions, such as arithmetic logic units that perform operations like addition, subtraction, multiplication, division, etc. Modern microprocessors include multiple execution units that execute the program instructions, such as integer units, floating-point units, or SIMD (single instruction, multiple data) units. The dispatch logic determines to which of the execution units to send each instruction, and gathers the input data (operands) needed by the instruction to perform the specified operation to generate a result. If the operands are not available for an instruction, then a bottleneck may develop at the instruction dispatcher with instructions backing up behind the bottlenecking instruction, even though they may be destined for a different execution unit than the bottlenecking instruction or may not be dependent upon the bottlenecking instruction. The result may be that the execution units are sitting idle with no instructions to execute.

Typically operands are available relatively quickly, since most operands are obtained from registers within the microprocessor that can provide the operands within a single clock cycle. Other operands, such as those specified by load instructions, specify their operands via memory addresses. Typically the memory operands can be obtained from cache memories inside the microprocessor that can provide the operands within a few clock cycles. However, sometimes the data specified by a load instruction may not be immediately available, such as if the specified data is missing in the cache. In modern microprocessors, the time required to fetch data from system memory into the microprocessor is between one and two orders of magnitude greater than the time required to fetch data from a register or cache within the microprocessor. The trend appears to be toward this ratio getting larger, thereby exacerbating the problem of load instructions causing pipeline stalls at the instruction dispatcher and creating pipeline bubbles. Therefore, what is needed is an apparatus and method for avoiding this problem.

SUMMARY

In one aspect, the present invention provides a pipeline microprocessor that distributes the instruction dispatching function between the main instruction dispatcher and additional dispatching logic within the execution units to allow instructions that follow an instruction experiencing a memory access-related delay to continue to be dispatched without stalling. The main instruction dispatcher requests load data whose memory address is specified by a load instruction from a data cache. If the data cache indicates the data is not presently available, then the instruction dispatcher provides the load instruction to the appropriate execution unit without the load data. The instruction dispatcher also provides the execution unit with a tag uniquely identifying the unavailable load data along with the instruction. The data cache also knows the unique tag number. The data cache subsequently obtains the data and places the data on a bus along with the unique tag and a valid indicator indicating the tag and data are valid. The dispatching logic in the execution unit meanwhile is monitoring the data cache bus looking for a valid tag that matches the tag previously provided to it by the instruction dispatcher. When the dispatch logic detects a valid tag match, it obtains the data from the bus and subsequently dispatches the instruction along with the data to a functional unit for execution. This operation is referred to as a detached load operation or a distributed load dispatch operation.

In another aspect, each of the execution units includes an instruction/data queue. The instruction dispatcher writes the load instruction into an entry of the queue and writes a value into a data valid indicator of the queue entry to indicate that the data is not valid for the instruction. The instruction dispatcher also writes other instructions, either load or non-load instructions for which it has all the operands, into the queue and marks their data valid indicators with a valid value. As the dispatch logic is monitoring the data cache bus, it only looks for tag matches with queue entry tags that have an invalid data valid indicator and a valid instruction indicator. Once the dispatch logic obtains the valid data from the data cache and places it into the queue entry storing the detached load instruction, the dispatch logic marks the data valid indicator valid to indicate that the detached load instruction is now ready for dispatching to the functional unit for execution.

In another aspect, the instruction dispatcher insures that the load instruction is a non-excepting instruction before dispatching the load instruction to the execution unit, thereby enabling the execution unit to retire the instruction as soon as it is executed. This approach has the advantage of enabling essentially unlimited dispatching of instructions following the detached load instruction as long as there are other instructions destined for other executions units than the execution unit holding the detached load instruction.

DETAILED DESCRIPTION

Figure 1:
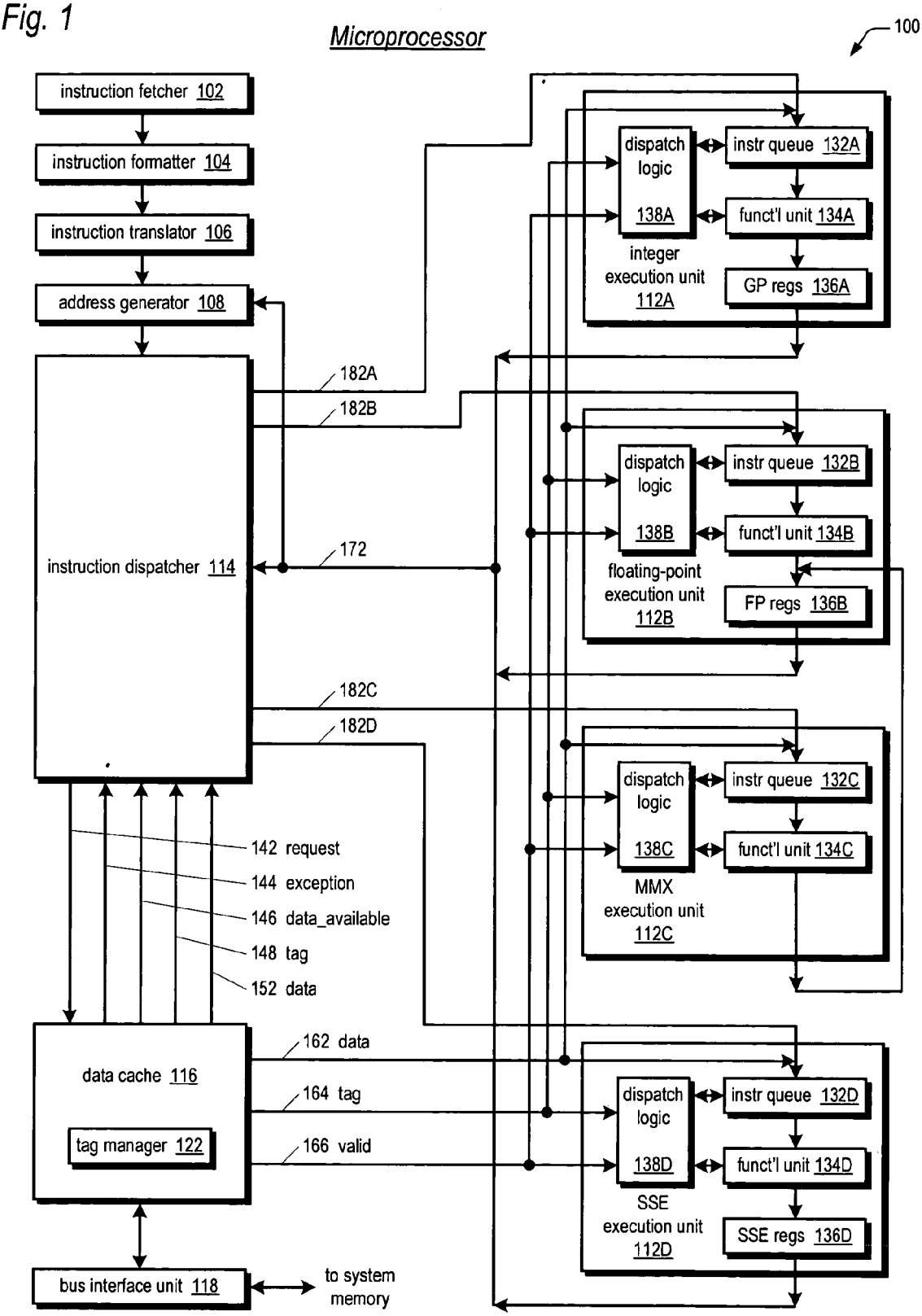
FIG. 1 is a block diagram illustrating a pipeline microprocessor according to the present invention.

Referring now to FIG. 1, a block diagram illustrating a pipeline microprocessor 100 according to the present invention is shown. The microprocessor 100 includes a plurality of pipeline stages. In one embodiment, the microprocessor 100 is capable of executing instructions substantially conforming to the x86 architecture instruction set.

The microprocessor 100 includes an instruction fetcher 102. The instruction fetcher 102 fetches program instructions from an instruction cache, or fetches instructions from a system memory coupled to the microprocessor 100 if instructions are missing in the instruction cache. The instructions fetched by the instruction fetcher 102 include load instructions. A load instruction is an instruction that specifies a memory address that identifies a location of data to be brought from the system memory into the microprocessor 100. If the memory address and data specified by the memory address are cached in a data cache 116 of the microprocessor 100, then the data may be loaded from the data cache 116 rather than from the system memory. A load instruction instructs the microprocessor 100 to bring the data specified by the memory address into the microprocessor 100, typically into a destination register specified by the load instruction. An example of an x86 load instruction is a MOV instruction that specifies a memory address as the source operand and a general purpose register as the destination operand. Another example of an x86 load instruction is an FLD instruction, which instructs the microprocessor 100 to load data from a memory address specified by a source operand into a floating-point register of the microprocessor 100. Another example of an x86 load instruction is a MOVSS, which instructs the microprocessor 100 to load data from a memory address specified by a source operand into a Streaming SIMD Extensions (SSE) register of the microprocessor 100.

The microprocessor 100 also includes an instruction formatter 104, coupled to the instruction fetcher 102. In one embodiment, the instruction set of the microprocessor 100 includes variable length instructions, such as the x86 architecture instruction set, rather than fixed-length instructions. The instruction formatter 104 parses a stream of instruction bytes and separates the stream into distinct instructions. In particular, the instruction formatter 104 determines the length and starting location of each instruction within the stream of instruction bytes. In one embodiment, the instruction formatter 104 provides formatted macroinstructions to an instruction queue for storing formatted instructions.

The microprocessor 100 also includes an instruction translator 106, coupled to the instruction formatter 104. In one embodiment, the microprocessor 100 includes a reduced instruction set computer (RISC) core. The RISC core executes a native instruction set. The native instructions, also referred to as microinstructions, are instructions that are relatively less complex and more efficiently executed than the program instructions fetched by the instruction fetcher 102, which are referred to as macroinstructions. For example, the x86 architecture instruction set comprises macroinstructions, or complex instruction set computer (CISC) instructions. The instruction translator 106 translates macroinstructions into microinstructions. The instruction translator 106 retrieves formatted macroinstructions from the instruction formatter 104 macroinstruction queue and translates each of the macroinstructions into one or more microinstructions for provision to the remaining stages of the pipeline 100. In addition, the microprocessor 100 also includes a microcode memory for storing microcode routines, which are employed by the instruction translator 106 for particularly complex or rarely used macroinstructions. The native instruction set includes RISC-style load microinstructions that specify a memory address that identifies a location of data to be brought from the system memory (or the data cache 116) into a destination register specified by the load microinstruction. In one embodiment, the native instruction set includes load microinstructions that both load data and perform a functional operation on the loaded data, referred to as Ld-Alu microinstructions. A load instruction for the purposes of the present disclosure comprises an instruction that instructs the microprocessor to read data from a memory location specified by a memory address into the microprocessor, and may comprise a macroinstruction or a microinstruction. In one embodiment, the instruction translator 106 provides microinstructions to a microinstruction queue for storing translated microinstructions.

The microprocessor 100 also includes an address generator 108 coupled to the instruction translator 106, an instruction dispatcher 114 coupled to the address generator, a data cache 116 coupled to the instruction dispatcher 114, a bus interface unit 118 coupled to the data cache 116, and a plurality of execution units 112 coupled to the instruction dispatcher 114 and data cache 116. In the embodiment of FIG. 1, the microprocessor 100 includes four execution units 112: an integer execution unit 112A, a floating-point execution unit 112B, a Multimedia Extensions (MMX) execution unit 112C, and an SSE execution unit 112D, referred to collectively as execution units 112 and generically as execution unit 112. In the embodiment of FIG. 1, the microprocessor 100 includes three register files: a general purpose register file 136A in the integer execution unit 112A, for storing data related to instructions executed by the integer execution unit 112A; a floating-point register file 136B in the floating-point unit 112B, for storing data related to instructions executed by the floating-point unit 112B and the MMX execution unit 112C; and an SSE register file 136D in the SSE execution unit 112D, for storing data related to instructions executed by the SSE execution unit 112D; referred to collectively as register files 136 and generically as register file 136.

The address generator 108 receives instructions from the instruction translator 106. The address generator 108 also receives operands from the register files 136 via an operand bus 172. If an instruction specifies a memory address, such as a load address of a load instruction, the address generator 108 generates a memory address for the instruction using input operands. The operands may include displacement or offset constants specified in the instruction itself and operands from the general purpose registers 136A, including segment register values. The register operands may be specified by the instruction explicitly. The register operands may be specified by the instruction implicitly, such as by a stack push or pop instruction that implicitly specifies a stack pointer register operand to be used in the memory address calculation. In one embodiment, the microprocessor 100 includes a register stage between the instruction translator 106 and the address generator 108 for obtaining operands from the register files 136 via an operand bus 172.

The instruction dispatcher 114 receives instructions and memory addresses from the address generator 108. The instruction dispatcher 114 also receives register operands from the register files 136 via the operand bus 172. The instruction dispatcher 114 dispatches the instructions to the appropriate one of the execution units 112. The instruction dispatcher 114 dispatches instructions to the integer execution unit 112A via an instruction/data bus 182A, to the floating-point execution unit 112B via an instruction/data bus 182B, to the MMX execution unit 112C via an instruction/data bus 182C, and to the SSE execution unit 112D via an instruction/data bus 182D. The instruction/data buses 182A–182D are referred to collectively as instruction/data buses 182 and generically as instruction/data bus 182. The instruction dispatcher 114 determines to which of the execution units 112 is configured to execute each instruction and dispatches the instruction to the appropriate execution unit 112. In the embodiment of FIG. 1, the instruction dispatcher 114 dispatches integer instructions to the integer execution unit 112A, floating-point instructions to the floating-point execution unit 112B, MMX instructions to the MMX execution unit 112C, and SSE instructions to the SSE execution unit 112D. In one embodiment, the execution units 112 may comprise multiple execution units of a particular type. For example, the microprocessor 100 may include two SSE execution units 112D. That is, multiple ones of the execution units 112 may be configured to execute a given instruction type. In these embodiments, the instruction dispatcher 114 also decides which execution unit 112 to dispatch the instruction to based on the workload of the execution units 112. That is, the instruction dispatcher 114 obtains information, such as how many instructions are queued up in each execution unit 112, from the execution units 112. The information enables the instruction dispatcher 114 to distribute the instructions evenly to the execution units 112 configured to execute the instruction for the purpose of optimizing program execution.

An operand is defined herein as an instruction input needed by the instruction to generate a result or perform a function. Generally, an instruction may specify an operand from one or more of three sources. One source is the instruction itself, which may provide a direct operand, i.e., a value that is coded into the bytes that comprise the instruction itself, such as an immediate data value or an address displacement or offset. A second source is registers, such as the registers comprising the register files 136 of the microprocessor 100, which provide register operands. A third source is memory, such as system memory or the data cache 116, which provide memory operands. In particular, load instructions specify a memory address of a memory operand to be loaded into a register of the microprocessor 100.

Generally, the instruction dispatcher 114 obtains the operands specified by the instruction and dispatches the instruction and its operands to the appropriate one of the execution units 112. If the operands for an instruction are not available, the instruction dispatcher 114 waits for the operands to be available before dispatching the instruction. A negative side effect is that subsequent instructions are kept from being dispatched to the execution units 112, which may result in one or more of the execution units 112 sitting idle even though some of the subsequent instructions could be executed by the execution units 112. This problem would be particularly encountered with load instructions if a memory operand is not available from the data cache 116 and requires a relatively long time to be obtained. However, advantageously, the present invention distinguishes load instructions from non-load instructions with respect to waiting for operands to be available. If a load instruction memory operand is not available from the data cache 116, then the instruction dispatcher 114 provides the instruction to the appropriate one of the execution units 112 without waiting for the memory operand, and the execution unit 112 subsequently obtains the memory operand from the data cache 116 and dispatches the instruction for execution, thereby avoiding the problem just described. This operation is referred to herein as a detached load operation, or distributed load dispatch operation, and is described in detail below.

If an instruction received by the instruction dispatcher 114 is a load instruction, the instruction dispatcher 114 issues a request 142 to the data cache 116 to read the load data specified by the load instruction. The request 142 includes the load memory address generated by the address generator 108. In response to the request 142 from the instruction dispatcher 114, the data cache 116 responds in one of three ways. First, the data cache 116 generates a true value on an exception signal 144 to the instruction dispatcher 114 if the read request generates an exception condition. Examples of exception conditions are debug exception, breakpoint exception, range exceeded exception, invalid opcode exception, double fault, segment not present exception, stack segment fault, general protection fault, page fault, alignment check exception, or machine check exception. If the data cache 116 does not generate a true value on the exception signal 144, then the load instruction is a non-excepting instruction. Second, the data cache 116 generates a false value on a data_available signal 146 to the instruction dispatcher 114 to indicate that the data specified by the load address is not presently available and provides a tag 148 to the instruction dispatcher 114 to uniquely identify the unavailable data. The instruction dispatcher 114 will provide the unique tag 148 to the appropriate execution unit 112, and the execution unit 112 will subsequently use the tag to obtain the requested data from the data cache 116, as described in detail below. Third, the data cache 116 generates a true value on the data_available signal 146 to indicate that the data specified by the load address is available and provides the requested data to the instruction dispatcher 114 on a data bus 152. The data cache 116 includes a tag manager 122 that manages the tags provided on tag signal 148 to insure that each outstanding detached load operation receives a unique tag. In one embodiment, the tag manager 122 maintains a rolling digit that is incremented each time a new tag is issued. The rolling digit is sufficiently large to guarantee that each detached load in the pipeline 100 at any give time has a unique tag.

The data cache 116 is also coupled to the bus interface unit 118. The data cache 116 issues requests to the bus interface unit 118 to load data from system memory or to store data to system memory via a processor bus that couples the microprocessor 100 to the system memory. The data cache 116 may comprise a hierarchy of cache memories, such as an L1 cache and L2 cache. In particular, if the instruction dispatcher 114 issues a load request 142 to the data cache 116 that misses in the data cache 116, i.e., the load address is not present in the data cache 116, then the data cache 116 requests the bus interface unit 118 to fetch one or more cache lines containing the missing load data from the system memory. The fetch of the missing load data from system memory may take a relatively long time—on the order of one hundred core clock cycles of the microprocessor 100 in some embodiments. Advantageously, the present invention enables the load to be dispatched to the execution units 112 without the load operand data, thereby enabling other instructions behind the load to also be dispatched to the execution units 112 rather than stalling in the upper pipeline stages and potentially leaving the execution units 112 idle. When the load data arrives from system memory and the bus interface unit 118 provides the missing load data to the data cache 116, the data cache 116 provides the load data on a data bus 162, provides the unique tag associated with the load data on a tag signal 164, and generates a true value on a valid signal 166. The data bus 162, tag signal 164, and valid signal 166 comprise a bus which is coupled to each of the execution units 112. In one embodiment, the data bus 162 comprises a 64-bit data bus. As described below, the execution units 112 monitor, or snoop, the data cache 116 bus to detect when the missing load data is provided by the data cache 116 in order to obtain the missing load data, or memory operand, for the load instruction that is pending in the appropriate execution unit 112.

Each of the execution units 112 includes an instruction queue 132x, a functional unit 134x, dispatch logic 138x, and a register file 136x, except for the MMX execution unit 112C, which shares a register file with the floating-point execution unit 112B. In FIG. 1, the "x" suffix is "A" for the integer execution unit 112A elements, "B" for the floating-point execution unit 112B elements, "C" for the MMX execution unit 112C elements, and "D" for the SSE execution unit 112D elements.

For each of the execution units 112, the instruction queue 132 receives instructions and operands from the instruction dispatcher 114 via instruction/data bus 182. The instruction queue 132 also receives data from data cache 116 via data bus 162. The structure of the instruction queue 132 is described in detail below with respect to FIGS. 2 and 3. The functional unit 134 is coupled to the instruction queue 132 and receives instructions and operands from the instruction queue 132 as controlled by the dispatch logic 138. The functional unit 134 executes the instruction by performing a functional operation on the operands as specified by the instruction, such as a shift, rotate, arithmetic, Boolean, load, store, control, test, compare, or other operation. The register file 136 is coupled to the functional unit 134 and receives the results of the functional unit 134 operations for storage therein. The dispatch logic 138 is coupled to the instruction queue 132 and functional unit 134. The dispatch logic 138 manages the instruction queue 132 and controls dispatching of instructions from the instruction queue 132 to the functional unit 134 for execution. The dispatch logic 138 also receives the tag 164 and valid 166 signals from the data cache 116 in order to monitor the data cache 116 bus for detached load data, as described below.

As defined herein, to dispatch, or issue, an instruction means to provide an instruction and its operands for execution. In the microprocessor 100 of FIG. 1, the instruction dispatcher 114 dispatches most instructions to one of the execution units 112. That is, the instruction dispatcher 114 provides most instructions to the execution units 112 along with their operands for execution. However, as described above and below, the instruction dispatcher 114 selectively provides load instructions to the execution units 112 without memory operands if the memory operands are not available. In this case, the dispatch logic 138 in the execution unit 112 subsequently obtains the unavailable memory operand from the data cache 116 and subsequently dispatches the instruction along with its operands to the functional unit 134. This operation is referred to herein as a detached load operation, or distributed load dispatch operation.

Figure 2:
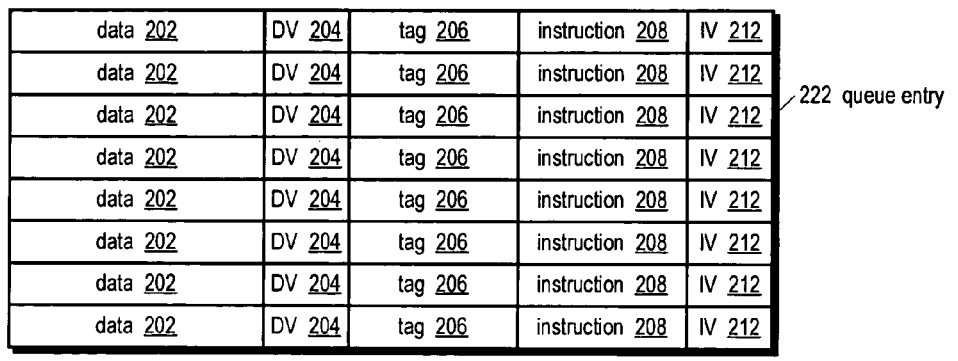
FIG. 2 is a block diagram illustrating an instruction queue of FIG. 1 according to the present invention.

Referring now to FIG. 2, a block diagram illustrating an instruction queue 132 of FIG. 1 according to the present invention is shown. The instruction queue 132 shown in FIG. 2 is representative of each of the instruction queues 132 in the execution units 112 of FIG. 1. The instruction queue 132 of FIG. 2 shows eight entries; however, the number of entries may vary for each execution unit 112 according to its needs, such as according to the type of instructions executed by the execution unit 112 and the typical amount of time required to execute each instruction.

Each queue entry 222 includes a data field 202, data valid (DV) field 204, tag field 206, instruction field 208, and instruction valid (IV) field 212. The instruction field 208 stores an instruction to be executed by the execution unit 112. The instruction field 208 may include the instruction bytes of the original macroinstruction or microinstruction. In addition, the instruction field 208 may include other information generated by decoding the instruction in previous stages of the pipeline 100. The IV field 212 is true if the instruction stored in the instruction field 208 is valid and false otherwise. Each time the instruction dispatcher 114 writes into the instruction queue 132, the IV field 212 of the queue entry 222 written is updated with a true value. When the dispatch logic 138 removes an instruction from a queue entry 222, the IV field 212 of the removed entry is updated with a false value. The data field 202 is used for storing instruction operands for the instruction stored in the instruction field 208, such as a load memory operand of a load instruction. The DV field 204 is true if the data stored in the data field 202 is valid and false otherwise. In one embodiment, the data field 202 comprises a plurality of fields for storing a plurality of operands and an associated plurality of DV fields 204. The tag field 206 is used to store a tag associated with a detached load operation and is written by the instruction dispatcher 114 with the unique tag provided by the data cache 116 when providing a load instruction for which a detached load operation is to be performed. Each of the queue entries 222 of the instruction queue 132 is provided to a multiplexer (not shown) which the dispatch logic 138 controls to select one of the queue entries 222 for provision to the functional unit 134. In one embodiment, the dispatch logic 138 dispatches instructions from the instruction queue 132 to the functional unit 134 in order received. However, other embodiments are contemplated in which the dispatch logic 138 dispatches instructions from the instruction queue 132 to the functional unit 134 out of order received. For example, the dispatch logic 138 may dispatch an instruction that has all its operands present ahead of a detached load instruction that does not yet have its detached load data present, as long as no dependency exists between the load instruction and the other instruction.

Figure 3:
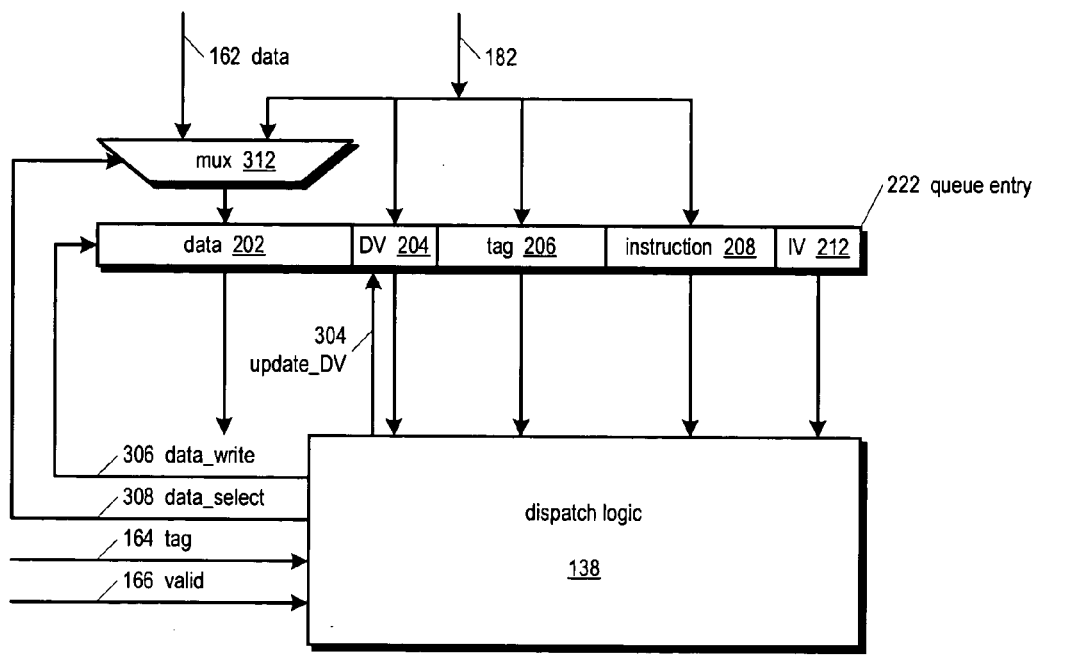
FIG. 3 is a block diagram illustrating portions of an execution unit of FIG. 1 according to the present invention.

Referring now to FIG. 3, a block diagram illustrating portions of an execution unit 112 of FIG. 1 according to the present invention is shown. The execution unit 112 includes the dispatch logic 138 of FIG. 1. FIG. 3 illustrates a single queue entry 222 which is representative of the plurality of queue entries 222 of the instruction queue 132 of FIG. 2. The execution unit 112 receives the instruction/data bus 182 from the instruction dispatcher 114. The instruction/data bus 182 includes a portion for writing a value into each of the DV field 204, tag field 206, and instruction field 208 of the queue entry 222. The dispatch logic 138 receives as input the value stored in each of the DV field 204, tag field 206, instruction field 208, and IV field 212 of the queue entry 222. The dispatch logic 138 also receives as input the tag signal 164 and valid signal 166 from the data cache 116.

The execution unit 112 also includes a two-input multiplexer 312 whose output is coupled to the input of the data field 202 of the queue entry 222. The execution unit 112 includes a multiplexer 312 for each queue entry 222. One input of the multiplexer 312 receives the data bus 162 from the data cache 116. The other input of the multiplexer 312 receives the data bus portion of the instruction/data bus 182 from the instruction dispatcher 114. The dispatch logic 138 generates a data_select signal 308 that is provided as a select input to the multiplexer 312 to control which of the two inputs is provided on the output. When the instruction dispatcher 114 writes to the queue entry 222, the dispatch logic 138 selects the instruction/data bus 182 input; when the detached load data is being obtained from the data cache 116, the dispatch logic 138 selects the data cache 116 data bus 162 input. Additionally, the dispatch logic 138 generates a true value on a data_write signal 306, which is provided to the data field 202 of the queue entry 222, to cause the output of the multiplexer 312 to be written to the data field 202 when the instruction dispatcher 114 writes to the queue entry 222 or when the dispatch logic 138 obtains the detached load data from the data cache 116. The dispatch logic 138 also generates an update_DV signal 304 to update the DV field 204 to a true value after the dispatch logic 138 obtains the detached load data from the data cache 116.

Figure 4:
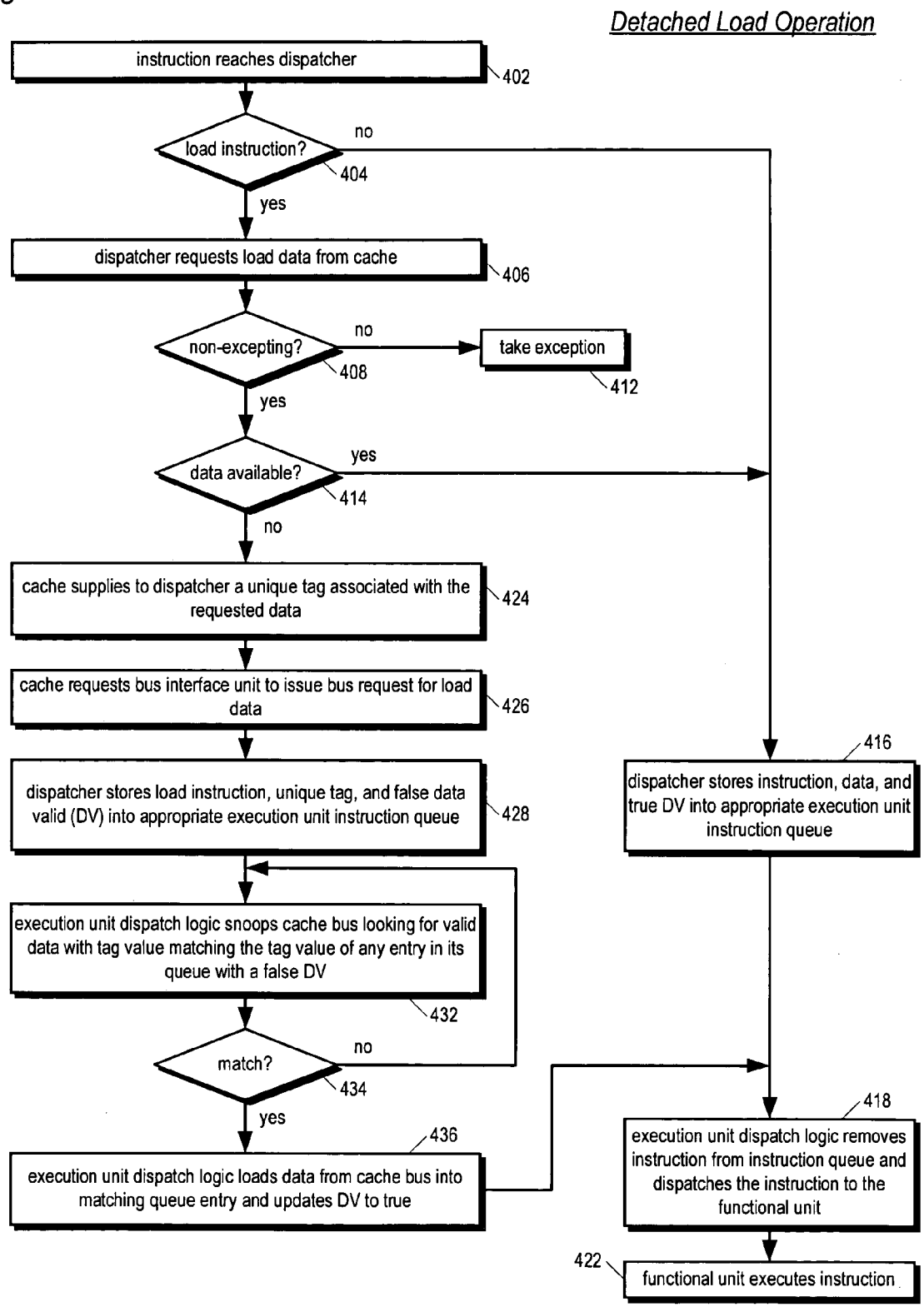
FIG. 4 is a flowchart illustrating operation of the microprocessor of FIG. 1 according to the present invention.

Referring now to FIG. 4, a flowchart illustrating operation of the microprocessor 100 of FIG. 1 according to the present invention is shown. Flow begins at block 402.

At block 402, an instruction reaches the instruction dispatcher 114. The instruction may be a load or a non-load instruction. In one embodiment, the instruction dispatcher 114 receives instructions one at a time. However, other embodiments are contemplated in which the microprocessor 100 is a superscalar processor in which the instruction dispatcher 114 receives multiple instructions per clock cycle and dispatches multiple instructions per clock cycle to the execution units 112. Flow proceeds to decision block 404.

At decision block 404, the instruction dispatcher 114 determines whether the instruction is a load instruction. If the instruction is a load instruction, flow proceeds to block 406; otherwise, flow proceeds to block 416.

At block 406, the instruction dispatcher 114 generates a request 142 to the data cache 116 for the load data specified by the memory address of the load instruction. Flow proceeds to decision block 408.

At decision block 408, the instruction dispatcher 114 examines the exception signal 144 from the data cache 116 to determine whether the load instruction is a non-excepting instruction. If the instruction is non-excepting, flow proceeds to decision block 414; otherwise, flow proceeds to block 412.

At block 412, the exception generated by the load instruction is taken, which typically requires flushing the instruction causing the exception condition. Flow ends at block 412.

At decision block 414, the instruction dispatcher 114 examines the data_available signal 146 to determine whether the load data requested by the instruction dispatcher 114 is available. The data may not be available because the data is missing from the data cache 116. That is, the load data memory address provided by the instruction dispatcher 114 to the data cache 116 misses in the data cache 116. The data cache 116 may also generate a false value on data_available signal 146 if the load data memory address hits in the data cache 116, but also matches a store operation address in the microprocessor pipeline 100 that contains newer data than the data cache 116 but that cannot be forwarded to the instruction dispatcher 114. If the data is available, flow proceeds to block 416; otherwise, flow proceeds to block 424.

At block 416, the instruction dispatcher 114, after obtaining all the operands of the instruction, writes the instruction and its operands into the instruction queue 132 of the appropriate execution unit 112. The instruction dispatcher 114 also writes a true value in the DV 204 field of the written queue entry 222 to indicate that the data 202 of the queue entry 222 is valid. The IV field 212 of the queue entry 222 is automatically updated to a true value in response to the write by the instruction dispatcher 114. Flow proceeds to block 418.

At block 418, once the instruction becomes the next candidate for dispatch, the dispatch logic 138 in the execution unit 112 removes the instruction from the instruction queue 132 and dispatches it to the functional unit 134 for execution. The IV field 212 of the queue entry 222 is automatically updated to a false value in response to the dispatch logic 138 removing the instruction from the entry 222 of the instruction queue 132. Flow proceeds to block 422.

At block 422, the functional unit executes the instruction. The functional unit 134 executing the instruction comprises performing operations necessary to generate the instruction result, such as shift, rotate, arithmetic, Boolean, load, store, control, test, compare, or other operations. The, functional unit 134 executing the instruction may also comprise updating the architectural state of the microprocessor 100 based on the result of the instruction, such as updating a register in one of the register files 136. In the case of a load instruction, it is possible to update the register file 136 since the load instruction was already determined to be a non-excepting instruction at decision block 408. In the case of a move type load instruction, the functional units 134 pass the load data through to the destination register in the register file 136. For some, move instructions, the functional unit 134 modifies or augments the data as it passes the load data through. For example, for a load with sign extend instruction the functional unit 134 provides the original data, but also provides additional bits of data that have a value equal to the sign of the original data. Flow ends at block 422.

At block 424, the data cache 116 provides a unique tag generated by the tag manager 122 associated with the detached load data to the instruction dispatcher 114 via tag signal 148. In an alternate embodiment, the instruction dispatcher 114 includes a tag manager, rather than the data cache 116, for managing the unique tags. In this embodiment, the instruction dispatcher 114 allocates a unique tag and includes the unique tag in its request 142 for data from the data cache 116. If the data cache 116 indicates the data is unavailable, the data cache 116 associates the unique tag with the load request. Flow proceeds to block 426.

At block 426, the data cache 116 requests the bus interface unit 118 to issue a bus request to the system memory for the load data if the load data is unavailable because the load data is missing from the data cache 116. If the load data is unavailable because the load data memory address matches a store operation address in the microprocessor pipeline 100 that contains newer data than the data cache 116 but that cannot be forwarded to the instruction dispatcher 114, then the data cache 116 waits for the newer data to be updated in the data cache 116. Flow proceeds to block 428.

At block 428, the instruction dispatcher 114 writes the instruction and any available operands already obtained into the instruction queue 132 of the appropriate execution unit 112. The instruction dispatcher 114 also writes a false value in the DV 204 field of the written queue entry 222 to indicate that the detached load data 202 of the queue entry 222 is invalid. The instruction dispatcher 114 also writes into the tag field 206 of the queue entry 222 the tag value received at block 424 from the data cache 116. The IV field 212 of the queue entry 222 is automatically updated to a true value in response to the write by the instruction dispatcher 114. Flow proceeds to block 432.

At block 432, the dispatch logic 138 monitors, or snoops, the tag signal 164 and the valid signal 166 of the data cache 116 bus to see if when the valid signal 166 is true the tag signal 164 matches the tag field 206 of any entry 222 in its instruction queue 132 that has a false DV value 204 and a true IV 212 value. Flow proceeds to decision block 434.

At decision block 434, the dispatch logic 138 determines whether a valid tag match occurred based on the monitoring of the data cache 116 bus at block 432. If there is a valid match, flow proceeds to block 436; otherwise, flow proceeds back to block 432.

At block 436, the dispatch logic 138 loads the data from the data cache 116 data bus 162 into the data field 202 of the-matching queue entry 222 by generating a value on the data_select signal 308 to cause the multiplexer 312 to select the data cache 116 data bus 162 and generating a true value on the data_write signal 306 to cause the detached load data to be written. Flow proceeds to block 418.

An advantage of the present invention is that it allows an essentially unlimited number of subsequent instructions to continue to be dispatched even while a load instruction whose data is not available is still pending, as long as the subsequent instructions are not dependent upon the missing load data. Since according to the present invention the instruction dispatcher 114 verifies that the load instruction is non-excepting before dispatching the load to the execution unit 112, the non-dependent instructions are no longer speculative with respect to the detached load instruction. Consequently, the non-dependent instructions can be retired from their execution units 112, thereby leaving queue entries 222 available in the execution unit 112 instruction queue 132 for more new non-dependent instructions. This is an advantage over conventional microprocessors. For example, in a microprocessor that employs a conventional reorder buffer, the number of instructions following a pending load that can be issued while the load is pending is limited to the depth of the reorder buffer since it is unknown whether the load will generate an exception until the execution unit handling the load notifies the reorder buffer that the load has completed.

Although the present invention and its objects, features and advantages have been described in detail, other embodiments are encompassed by the invention. For example, although a microprocessor embodiment is described substantially conforming to the x86 architecture, the apparatus and method described are not limited to the x86 architecture and may be employed in various microprocessor architectures. In addition, although the invention has been described with respect to load instructions, the invention may be extended for use with any instructions that encounter long latencies for obtaining operands. Finally, although embodiments have been described with particular numbers of execution units of particular types, one skilled in the art will recognize that the invention may be employed with various combinations of numbers and types of execution units.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus in a pipeline microprocessor for avoiding a pipeline stall caused by a load instruction, the microprocessor including execution units, the apparatus comprising:

first dispatch logic, configured to request from a cache data specified by the load instruction, to receive from said cache an indication that said data is not presently available from said cache, and to provide the load instruction and a tag identifying said unavailable data to one of the execution units; and second dispatch logic in each of the execution units, coupled to said cache, configured to monitor a bus coupling said cache and the execution units to detect a valid match of said tag which indicates said data is now available from said cache, to obtain said data from said cache in response to detecting said valid match of said tag, and to dispatch the load instruction and said data for execution in response to obtaining said data from said cache.

2. The apparatus of claim 1, wherein said first dispatch logic provides the load instruction and said tag to said one of the execution units in response to said indication that said data is not presently available from said cache, rather than stalling the microprocessor pipeline to wait for the data to become available from said cache.

3. The apparatus of claim 1, wherein said second dispatch logic dispatches the load instruction and said data for execution by a functional unit of said one of the execution units.

4. The apparatus of claim 3, wherein said functional unit is configured to move said data into a register maintained by the execution unit.

5. The apparatus of claim 3, wherein said functional unit is configured to perform an operation specified by the load instruction to generate a result.

6. The apparatus of claim 3, wherein said operation comprises an integer arithmetic operation.

7. The apparatus of claim 3, wherein said operation comprises a floating-point arithmetic operation.

8. The apparatus of claim 3, wherein said operation comprises a packed arithmetic operation.

9. The apparatus of claim 8, wherein said operation comprises an MMX packed arithmetic operation.

10. The apparatus of claim 8, wherein said operation comprises an SSE packed arithmetic operation.

11. The apparatus of claim 1, wherein said first dispatch logic is further configured to determine to which of the execution units to provide the load instruction for execution.

12. The apparatus of claim 11, wherein said first dispatch logic determines to which of the execution units to provide the load instruction for execution based on a type of the load instruction.

13. The apparatus of claim 11, wherein said first dispatch logic determines to which of the execution units to provide the load instruction for execution based on a current workload of the execution units.

14. The apparatus of claim 1, further comprising:
an instruction queue, in each of the execution units, configured to store a plurality of the load instruction and said tag received from said first dispatch logic.

15. The apparatus of claim 14, wherein said instruction queue is also configured to store a plurality of said data obtained from said cache.

16. The apparatus of claim 15, wherein said instruction queue is also configured to store a plurality of valid indicators associated with said plurality of said data, each for indicating whether said data is valid.

17. The apparatus of claim 16, wherein if said first dispatch logic receives from said cache said indication that said data is not presently available from said cache, said first dispatch logic also stores a value in said valid indicator to indicate said data is invalid along with providing the load instruction and said tag to said one of the execution units.

18. The apparatus of claim 17, wherein said second dispatch logic is further configured to update said value in said valid indicator to indicate said data is valid in response to obtaining said data from said cache.

19. The apparatus of claim 16, wherein if said first dispatch logic receives from said cache an indication that said data is present in said cache, then said first dispatch logic provides the load instruction and said data from said cache to said one of the execution units and stores a value in said valid indicator to indicate said data is valid.

20. The apparatus of claim 19, wherein said second dispatch logic dispatches the load instruction and said data after said first dispatch logic provides the load instruction and said data to said one of the execution units and stores said value in said valid indicator to indicate said data is valid.

21. The apparatus of claim 1, wherein said first dispatch logic provides the load instruction to said one of the execution units only if the load instruction is determined not to generate an exception.

22. The apparatus of claim 1, wherein said first dispatch logic is further configured to provide non-load instructions and all valid operands to said one of the execution units.

23. The apparatus of claim 1, wherein said tag uniquely identifies said unavailable data.

24. The apparatus of claim 23, wherein said cache manages generation of said tag uniquely identifying said unavailable data to said first dispatch logic.

25. The apparatus of claim 23, wherein said first dispatch logic manages generation of said tag uniquely identifying said unavailable data to said cache.

26. The apparatus of claim 1, wherein said load instruction comprises a microinstruction that loads data from a memory address and performs an arithmetic operation on the data.

27. The apparatus of claim 1, wherein said cache provides to said first dispatch logic said indication that said data is not presently available from said cache if an address of said data misses in said cache.

28. The apparatus of claim 1, wherein said cache provides to said first dispatch logic said indication that said data is not presently available from said cache if an address of said data hits in said cache, but said address in said cache is invalid because said address matches a store operation address in the microprocessor pipeline.

29. The apparatus of claim 28, wherein said pipeline is presently unable to forward said store operation data to said cache.

30. The apparatus of claim 1, wherein said first dispatch logic is located earlier in the microprocessor pipeline than the execution units.

31. The apparatus of claim 1, wherein said second dispatch logic obtains said data from said cache via said bus.

32. The apparatus of claim 1, wherein said load instruction comprises an instruction that instructs the microprocessor to read said data from a memory location specified by a memory address into the microprocessor.

33. The apparatus of claim 1, wherein a computer program product comprising a computer usable medium having computer readable program code causes the apparatus, wherein said computer program product is for use with a computing device.

34. The apparatus of claim 1, wherein a computer data signal embodied in a transmission medium comprising computer-readable program code provides the apparatus.

35. A pipeline microprocessor, comprising:
a data cache, coupled to a bus;
a plurality of execution units, each coupled to said data cache by said bus, each having an instruction queue and dispatch logic for dispatching instructions from said queue to a functional unit of the execution unit for execution thereof after said instruction queue indicates all operands of the instructions are valid; and
an instruction dispatcher, coupled to said plurality of execution units, configured to provide to said instruction queues of said plurality of execution units instructions and operands thereof and an indication of whether said operands are valid, wherein if an instruction operand is unavailable from said data cache, said instruction dispatcher provides said instruction to said instruction queue with an indication that said unavailable operand is invalid, rather than stalling subsequent instructions in the pipeline to wait for said operand from said data cache.

36. The microprocessor of claim 35, wherein said instruction dispatcher is further configured to provide to said instruction queue a tag uniquely identifying said unavailable operand.

37. The microprocessor of claim 36, wherein said dispatch logic is further configured to subsequently obtain said unavailable operand from said data cache via said bus in response to detecting a match of said tag previously provided by said instruction dispatcher with a tag transmitted on said bus by said data cache along with said unavailable operand.

38. The microprocessor of claim 37, wherein said dispatch logic is further configured to subsequently dispatch said instruction and said previously unavailable operand to said functional unit for execution in response to obtaining said previously unavailable operand from said data cache via said bus.

39. The microprocessor of claim 35, wherein said plurality of execution units comprise at least an integer execution unit, a floating-point execution unit, an MMX execution unit, and an SSE execution unit.

40. The microprocessor of claim 35, wherein said instruction comprises a load instruction.

41. A method for performing distributed load instruction dispatching in a pipeline microprocessor having a cache, a central instruction dispatcher and a plurality of execution units each having auxiliary instruction dispatching logic, the method comprising:
   receiving, by the central instruction dispatcher, from the cache an indication that operand data specified by a load instruction is unavailable;
   providing, by the central instruction dispatcher, the load instruction to one of the plurality of execution units and indicating that the data is unavailable; and
   obtaining, by the auxiliary instruction dispatching logic in the one of the plurality of execution units, the operand data from the cache subsequent to said indicating to the one of the plurality of execution units that the data is unavailable.

42. The method of claim 41, further comprising:
   dispatching for execution, by the auxiliary instruction dispatching logic in the one of the plurality of execution units, the instruction and the obtained operand data to a functional unit in the one of the plurality of execution units subsequent to said obtaining.

43. The method of claim 41, further comprising:
   determining whether the load instruction is an exception-generating instruction; and
   said providing the load instruction to the one of the plurality of execution units only if the load instruction is not an exception-generating instruction.

44. The method of claim 41, further comprising:
   providing, by the central instruction dispatcher, a tag uniquely identifying the unavailable data to one of the plurality of execution units prior to said obtaining, by the auxiliary instruction dispatching logic in the one of the plurality of execution units, the operand data from the cache.

45. The method of claim 44, further comprising:
   transmitting, by the cache, the tag uniquely identifying the unavailable data on a bus subsequent to said providing, by the central instruction dispatcher, the tag uniquely identifying the unavailable data to the one of the plurality of execution units.

46. The method of claim 45, further comprising:
   detecting, by the auxiliary instruction dispatching logic in the one of the plurality of execution units, a match of the tag uniquely identifying the unavailable data on the bus in response to said transmitting; and
   said obtaining, by the auxiliary instruction dispatching logic in the one of the plurality of execution units, the operand data from the cache in response to said detecting.

47. The method of claim 41, further comprising:
   obtaining, by the data cache, the operand data subsequent to said indicating, by the central instruction dispatcher, to the one of the plurality of execution units that the data is unavailable.

48. The method of claim 41, wherein said providing, by the central dispatch logic, the load instruction to the one of the plurality of execution units comprises writing the load instruction into an instruction queue of the one of the plurality of execution units.

49. A computer program product on a computer usable storage medium for use with a computing device, the computer program product comprising:
   a computer-readable storage medium, having computer-readable program code embodied in said medium for providing an apparatus in a pipeline microprocessor for avoiding a pipeline stall caused by a load instruction, the microprocessor including execution units, said program code comprising:
      first program code for providing first dispatch logic, configured to request from a cache data specified by the load instruction, to receive from said cache an indication that said data is not presently available from said cache, and to provide the load instruction and a tag identifying said unavailable data for execution to one of the execution units; and
      second program code for providing second dispatch logic in each of the execution units, coupled to said cache, configured to monitor a bus coupling said cache and the execution units to detect a valid match of said tag which indicates said data is now available from said cache, to obtain said data from said cache in response to detecting said valid match of said tag, and to dispatch the load instruction and said data in response to obtaining said data from said cache.

* * * * *